United States Patent

Otake

[11] Patent Number: 6,055,892
[45] Date of Patent: May 2, 2000

[54] WORK FEEDER FOR A VERTICAL MACHINE TOOL WITH MOVABLE SPINDLE

[75] Inventor: Kimitaka Otake, Abiko, Japan

[73] Assignee: Hitachi Seiko Co., Ltd., Abiko, Japan

[21] Appl. No.: 09/170,261

[22] Filed: Oct. 13, 1998

[30] Foreign Application Priority Data

Oct. 15, 1997 [JP] Japan .................................. P9-297774

[51] Int. Cl.[7] .................................................. B23B 13/00
[52] U.S. Cl. ............................... 82/124; 82/125; 82/126; 82/127; 82/162; 414/14
[58] Field of Search .......................... 82/124, 122, 125, 82/126, 127, 128, 101, 102, 162, 163, 164; 414/14, 17, 18

[56] References Cited

U.S. PATENT DOCUMENTS

| | | | |
|---|---|---|---|
| 4,442,739 | 4/1984 | Swanson, Jr. et al. | 82/124 |
| 4,929,138 | 5/1990 | Breuning | 82/125 X |
| 5,081,889 | 1/1992 | Takano et al. | 82/124 X |
| 5,293,794 | 3/1994 | Mosey | 82/125 |
| 5,366,334 | 11/1994 | Cucchi | 82/126 X |

FOREIGN PATENT DOCUMENTS

| | | |
|---|---|---|
| 62-166902 | 7/1987 | Japan . |
| 62-199301 | 9/1987 | Japan . |
| 2-46321 | 10/1990 | Japan . |

*Primary Examiner*—Henry W. H. Tsai
*Attorney, Agent, or Firm*—Armstrong, Westerman, Hattori, McLeland and Naughton

[57] ABSTRACT

A vertical machine tool with a movable main spindle has a headstock for supporting a spindle having an axis in a vertical direction. A work feeder gives and takes a work between the work feeder and a chuck. The work feeder includes a work feeder frame provided in the vicinity of a machine body, a swivel member driven by a driving means for swivelling, a plurality of pallets mounted on the swivel member, and a supporting device disposed in a work receipt/ release position where the pallet is positioned for receiving/ releasing the work between the pallet and the chuck. The supporting device supports the pallet, positioned in the work receipt/release position, movably up and down in the direction of the axis of the spindle. The receipt/release of the work may be performed under the condition that the work is kept depressed to the chuck.

19 Claims, 7 Drawing Sheets

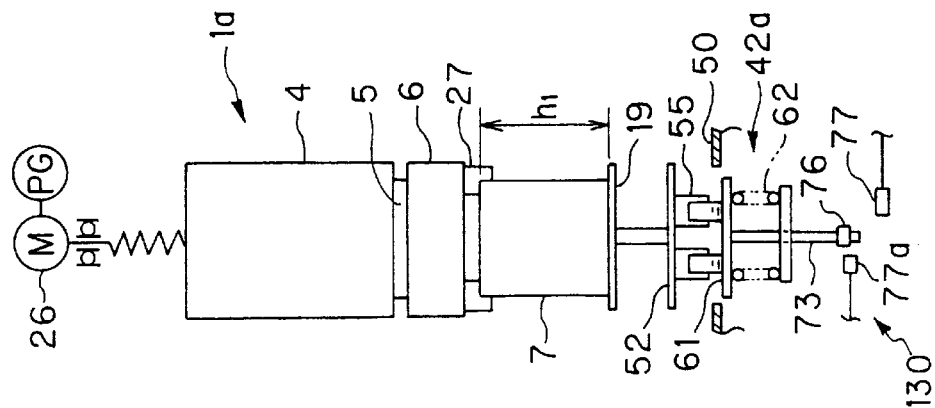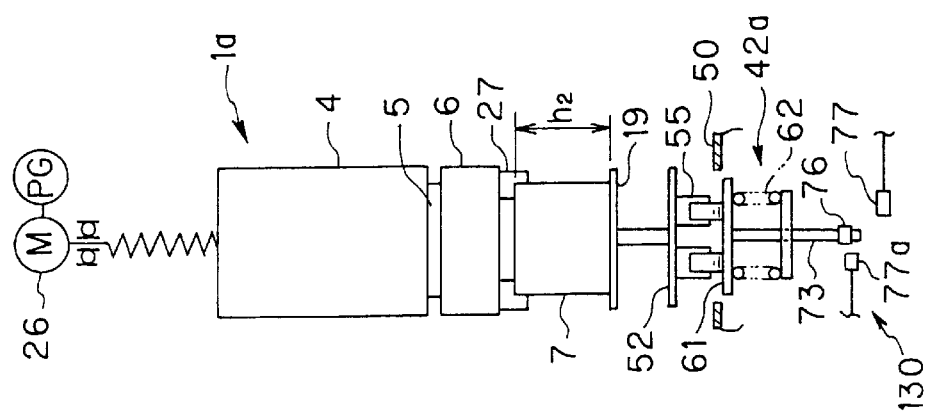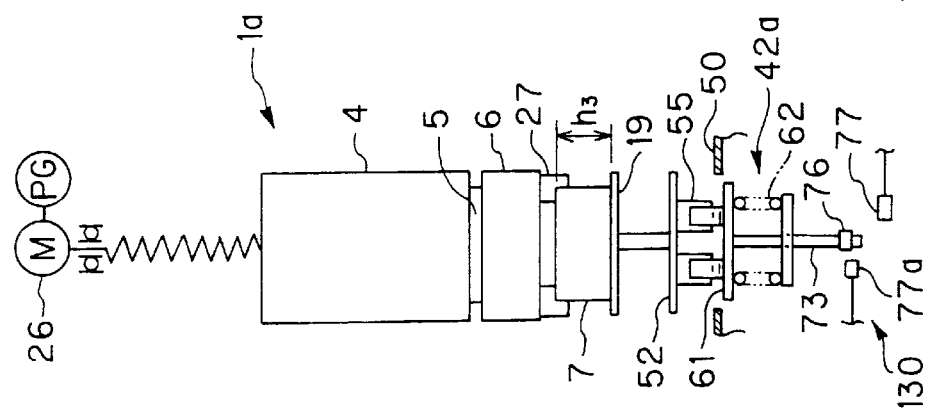

WORK FEEDER FOR A VERTICAL MACHINE TOOL WITH MOVABLE SPINDLE

BACKGROUND OF THE INVENTION

1. Field of the Invention

The present invention relates to a work feeder provided in a vertical machine tool with a spindle, such as a vertical lathe with a movable main spindle.

The vertical machine tool has a headstock for rotatably supporting a spindle having an axis in a vertical direction or in a direction slanted at a predetermined angle relative to the vertical direction. The headstock is moved at least in an axial direction (Z-axis direction) of the above-described main spindle and a direction (X-axis direction) perpendicular to the axial direction of the main spindle. A work (namely, workpiece) is detachably held by a chuck provided at a lower end of the above-described spindle.

2. Description of the Related Art

In the lathe among machine tools, a chuck is mounted at a tip end of a main spindle, and a work is clamped by the chuck for rotation. Among lathes, a vertical lathe having a main spindle axis directed up and down (in the vertical direction) is known in addition to a kind of vertical lathe having a main spindle directed horizontally.

For example, Japanese Patent Application Laid-Open Nos. Sho 62-166902 and 62-199301 disclose a vertical type, composite numerically controlled lathe (vertical NC lathe) with a work index table.

This lathe is of the main spindle fixed type. For this reason, it is necessary to provide a material mover (hydraulic cylinder, or the like) for moving vertically the material for loading and unloading the material relative to a power chuck, and a hydraulic cylinder for reciprocating the index table. As a result, the lathe becomes complicated in structure.

In contrast, Examined Japanese Patent Publication No. Hei 2-46321 filed by the present applicant, discloses an improved machine tool in which a main spindle is moved so that a chuck provided at a lower end of the main spindle may directly clamp a work to effect the machining.

In this machine tool, the material mover, the hydraulic cylinder, and the like, are dispensed with, thereby simplifying the structure. A work feeder (automatic workpiece feeding device) for automatically feeding works is provided.

In some cases, a non-machined work, such as a raw work before machining, intrinsically suffers from non-uniformity in dimension (for example, a diameter dimension, an axial length dimension).

Even with such non-uniformity, in the vertical machine tool with the movable main spindle, it is necessary to avoid excessive depression of the chuck for clamping the non-machined work to cause an extra load toward the machine tool (in particular, on the main spindle portion, such as bearings for rotatably supporting the main spindle). Also, in the machine tool, it is necessary to positively bring the non-machined work into intimate contact with the chuck and to hold the work with high precision.

However, in the machine tool disclosed in Examined Japanese Patent Publication No. Hei 2-46321, any consideration of the non-uniformity of the non-machined work is not paid. Accordingly, if the non-machined work suffers from a non-uniformity in dimension, it is difficult to perform the operation of holding the non-machined work in intimate contact with the chuck with high precision.

For this reason, conventionally, in the case where the non-machined work is clamped by a chuck, in order to bring the non-machined work into intimate contact with claws of the chuck, in some cases, it is necessary to independently provide a pusher specialized in pushing in a tool rest or a tailstock of the lathe. In this case, since it takes a long time to bring the work into intimate contact with the chuck by the pusher, it also takes a long time to exchange works, which creates the non-working time of the machine tool.

In addition, in order to positively receive the non-machined work from the work feeder to the chuck and to clamp the non-machined work, an operator must always lay the non-machined work within a grip range of the chuck. For this reason, the operator must lay the non-machined works so that centers of the non-machined works are substantially identical with each other on the work feeder. The workability is inferior.

Also, if a large non-uniformity exceeding the stroke for gripping of the claws of the chuck occurs in a position on a pallet where the operator lays the non-machined works, it is difficult to grip the non-machined work by the chuck. Also, there is a fear that the claws and the non-machined work would collide with each other.

SUMMARY OF THE INVENTION

In order to overcome the above-noted defects, an object of the present invention is to provide a work feeder for a vertical machine tool with a movable main spindle, in which the non-machined work may be brought into intimate contact with a chuck with high precision and without failure and without applying any large load on the main spindle to be well gripped by the chuck when the chuck receives the non-machined work.

Also, another object of the present invention is to facilitate the operation when an operator lays the non-machined work on the work feeder.

Still another object of the present invention is to identify a kind of the work when the non-machined work is received by the chuck.

In order to attain the above-noted and other objects, according to the present invention, there is provided a work feeder for a vertical machine tool, with a movable main spindle, in which a headstock for rotatably supporting the main spindle having an axis in a vertical direction or a direction slanted at a predetermined angle relative to the vertical direction is moved at least in a direction of the axis of the main spindle and in a direction perpendicular to the axis, a work feeder for giving and taking a work between the work feeder and a chuck provided at a lower end of the main spindle. The work feeder comprises: a work feeder frame provided at a predetermined position in the vicinity of a machine body of the machine tool; a swivel member provided in the work feeder frame and driven by a driving means for swivelling; a plurality of pallets mounted on the swivel member and provided movably on a delivery surface of the work feeder frame, each pallet having an upper surface on which the work is laid; and a supporting device provided on the work feeder frame and disposed in a work receipt/release position where the pallet is positioned for receiving or releasing the work between the pallet and the chuck, the supporting device supporting the pallet, positioned in the work receipt/release position, movably up and down in the direction of the axis of the main spindle, wherein the receipt/release of the work may be performed under the condition that the work is kept depressed to the chuck by a predetermined load. As used herein the expression,"work receipt/release location" means that location with respect to the machine tool at which work to be machined is admitted to the chuck or from which work, which has been machined, is removed from the chuck. More specifically, the work receipt/release location includes a non-machined work receipt position at which the chuck receives the non-machined work, laid on the upper surface of the pallet, from the pallet for machining the work in the machine tool;

and a machined work release position, juxtaposed with the non-machined work receipt position, at which the chuck releases the machined work, subjected to the machining operation in the machine tool, to the upper surface of the pallet. The supporting device is provided at least in the non-machined work-receipt position.

Preferably, the supporting devices are provided in the non-machined work-receipt position and the machined work release position.

An upper surface of the supporting device for supporting the pallet is substantially flush with the delivery surface of the work feeder frame when the chuck is not urged to depress the non-machined work or the machined work in the direction of the axis of the main spindle, whereby the pallet may be moved.

The supporting device supports the pallet movably up and down in the direction of the axis of the main spindle and movably obliquely, so that the non-machined work may be gripped in intimate contact with the chuck.

The supporting device includes: an elevating member provided movably up and down and movably obliquely within an opening portion formed in an upper frame and a guide plate mounted on the upper frame for constituting the work feeder frame; and a biasing member for biasing the elevating member upwardly in the direction of the axis of the main spindle. The upper surface of the elevating member and the upper surface of the guide plate are substantially flush with each other when the elevating member is located at an upper position.

The elevating member has a rod-like member, directed downwardly, fixed downwardly from a central portion of the elevating member; a detected portion is mounted on a lower portion of the rod-like member, and a lower limit detector is mounted on the work feeder frame. When the chuck depresses the non-machined work for gripping the non-machined work, if the detected portion is operated in a lowering fashion exceeding a predetermined position, the lower limit detector detects the detected portion to detect generation of abnormality.

The work feeder may include a non-machined work presence/absence detecting means for detecting whether or not the non-machined work is laid on the upper surface of the pallet position in the non-machined work receipt position.

The work feeder may further include a machined work presence/absence detecting means for detecting whether or not the machined work is laid on the upper surface of the pallet position in the machined work release position.

The work feeder may further include a centering device provided on the work feeder frame. When the pallet is indexed to the non-machined work receipt position, the centering device positions the non-machined work laid on the pallet to a predetermined position where the chuck may receive the work.

The work feeder may further include a work axial direction dimension measuring means for measuring dimensions ($h_1$, $h_2$, $h_3$) in the axial direction of the non-machined work laid on the pallet when the chuck grips the non-machined work. A kind of the work to be machined in the machine tool is specified in accordance with the dimensions ($h_1$, $h_2$, $h_3$) in the axial direction of the non-machined work.

The driving means includes a chain driving means and the swivel member includes an endless chain driven by the chain driving means for swivelling.

The chain driving means includes: a driving motor mounted on the work feeder frame; a sprocket supported rotatably to the work feeder frame, driven by the driving motor and rotated in forward and reverse direction about one rotational center ($C_1$) on the drive side as desired; and the other sprocket supported on the work feeder frame and rotated in forward and reverse direction about the other rotational center ($C_2$) as desired. The sprocket is pivoted about a support shaft fixed to the upper frame constituting the work feeder frame, and the chain is wound around the sprocket and the other sprocket.

The guide plate disposed in the horizontal direction and having an elongated rectangular shape corresponding to an overall shape of the chain is fixed to the upper surface of the upper frame, and the chain is positioned above, and in parallel with, the guide plate.

The pallet is supported by a support member through connecting rods connected to the chain, and a plurality of pallets are disposed above the guide plate at a constant pitch (P). A rolling means that rolls freely in any direction on the upper surface of the guide plate is mounted on a lower portion of the support member. An index position of the pallet is detected by an index position detecting means to rotate and control the driving motor so that the pallet makes a swivel motion and is moved intermittently by one pitch (P) to be indexed to a predetermined position.

According to another aspect of the invention, in a vertical machine tool, with a movable main spindle, in which a headstock for rotatably supporting the main spindle having an axis (C) in a vertical direction or a direction slanted at a predetermined angle relative to the vertical direction is moved at least in a direction of the axis (C) of the main spindle and in a direction perpendicular to the axis (C), a work feeder for giving and taking a work a chuck provided at a lower end of the main spindle. The work feeder includes: a work feeder frame provided at a predetermined position in the vicinity of a machine body of the machine tool; a swivel member provided in the work feeder frame and driven by a driving means for swivelling; a plurality of pallets mounted on the swivel member and provided movably on a delivery surface of the work feeder frame, each pallet having an upper surface on which the work is laid; and a centering device disposed in a non-machined work-receipt position where the chuck receives the non-machined work, laid on the upper surface of the pallet, from the pallet for machining the work in the machine tool, the centering device being provided on the work feeder frame for centering the non-machined work laid on the pallet positioned in the non-machined work-receipt position, to a predetermined position where the chuck may receive the work.

The centering device is disposed at a position slanted at a predetermined angle relative to a longitudinal centerline ($C_4$) of the work feeder, so as not to be an obstruction to the swivel motion of the pallet on which the work is laid, and so as not to be an obstruction to the work gripping operation of the main spindle.

The centering device includes: a stationary centering member provided on the work feeder frame movably in a radial direction of the non-machined work laid on the upper surface of the pallet positioned in the non-machined work-receipt position, the stationary centering member being fixedly positioned to a desired position by a fastening member and being brought into contact with an outer circumferential surface of the non-machined work; and a movable centering member provided on the work feeder frame to face the stationary centering member, driven by an advancement/retraction moving means so that a pusher is moved back and forth in the radial direction for depressing the outer circumferential surface of the non-machined work toward the stationary centering member from the other side for centering.

The centering device includes: a pair of arm members clamping, from both sides, an outer circumferential surface of the non-machined work laid on the upper surface of the pallet positioned in the non-machined work receipt position; and an arm opening/closing driving means for opening and closing the pair of arm members in synchronism.

With such an arrangement, it is possible to provide a work feeder for a vertical machine tool, with a movable main spindle, in which the non-machined work may be brought into intimate contact with the chuck with high precision and without failure without applying any large load on the main spindle and may be well gripped by the chuck when the chuck receives the non-machined work.

Also, since the work exchanging time is not increased due to the intimate contact operation, it is possible to shorten the non-machining time.

BRIEF DESCRIPTION OF THE DRAWINGS

In the accompanying drawings:

FIG. 1 is an overall plan view showing a vertical lathe with a movable main spindle;

FIG. 2 is an overall frontal view showing the lathe;

FIG. 3 is an enlarged partial longitudinal sectional view showing a work feeder;

FIG. 4 is a plan sectional view taken along the line IV—IV of FIG. 3, in which a centering device has been removed;

FIG. 5 is a partially enlarged plan view showing the work feeder having the centering device;

FIG. 7 is a view showing a third embodiment of the present invention and is an illustration of the case in which a kind of the work is identified;

FIG. 8 is an illustration showing the case in which another work is identified; and FIG. 9 is an illustration showing the case in which still another work is identified.

DESCRIPTION OF THE PREFERRED EMBODIMENTS

An example of a best mode of the present invention will now be described with reference to FIGS. 1 to 9.

The following embodiments are related to a vertical lathe used as a vertical machine tool, with a movable main spindle, having a work feeder (automatic work feeder). In the machine tool, a headstock for rotatably supporting a main spindle having an axis in the vertical direction is moved at least in an axial direction of the main spindle and in a direction perpendicular to the axial direction of the main spindle. Then, by using a chuck provided at a lower end of the main spindle, a work fed from the work feeder is detachably clamped automatically whereby the work is given to or taken from the chuck.

If the machine tool meets these requirements, the machine tool, may be any other type machine tool such as a turning center, or a grinding machine, or the like.

Also, the axis of the main spindle of the vertical machine tool is directed in the vertical direction with respect to a floor surface. However, it is possible to change the angle of the axis at a predetermined slant angle relative to the vertical direction.

(Embodiment 1)

Figure 1:
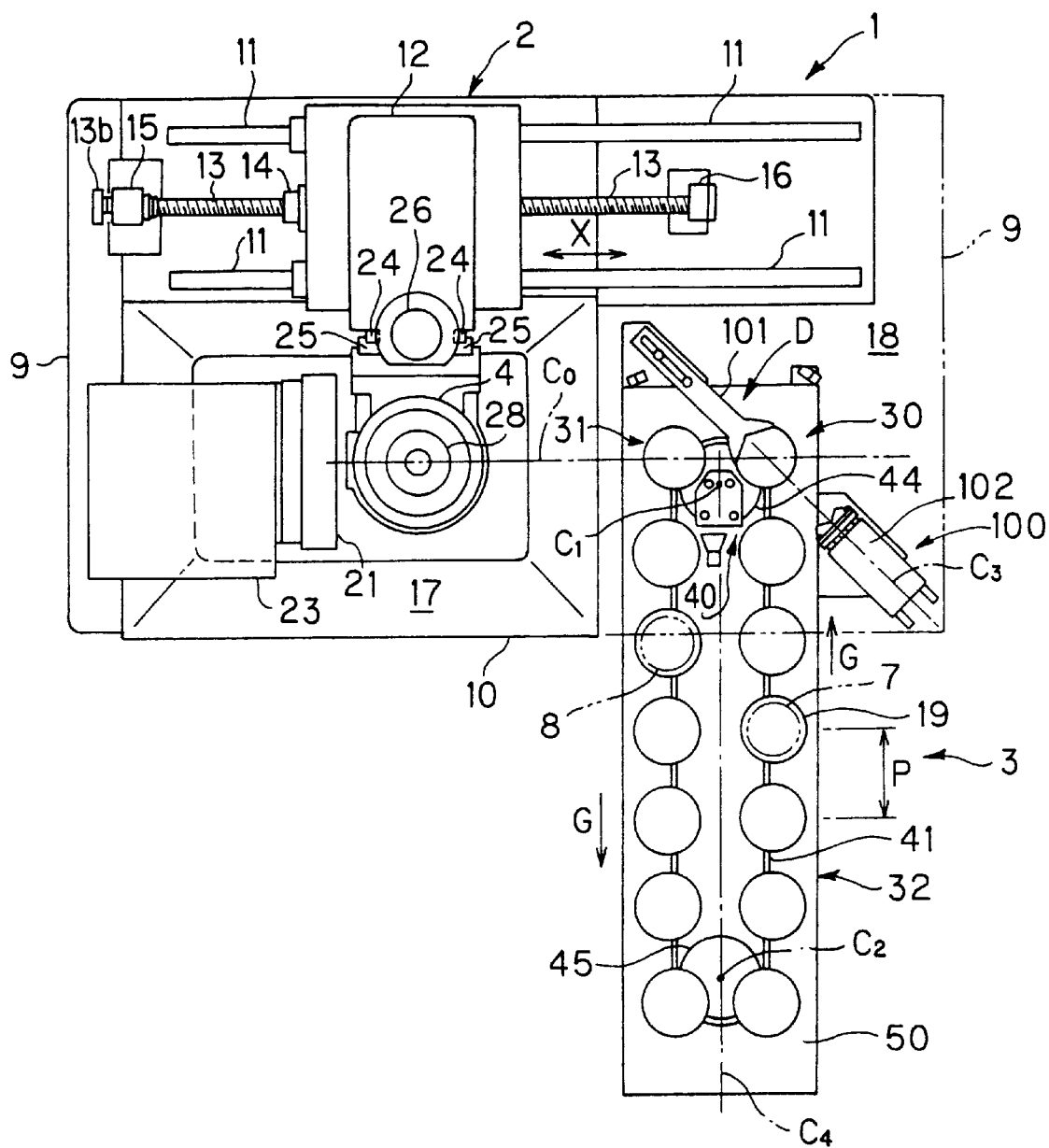
FIGS. 1 to 5 show a first embodiment of the present invention.
Figure 2:
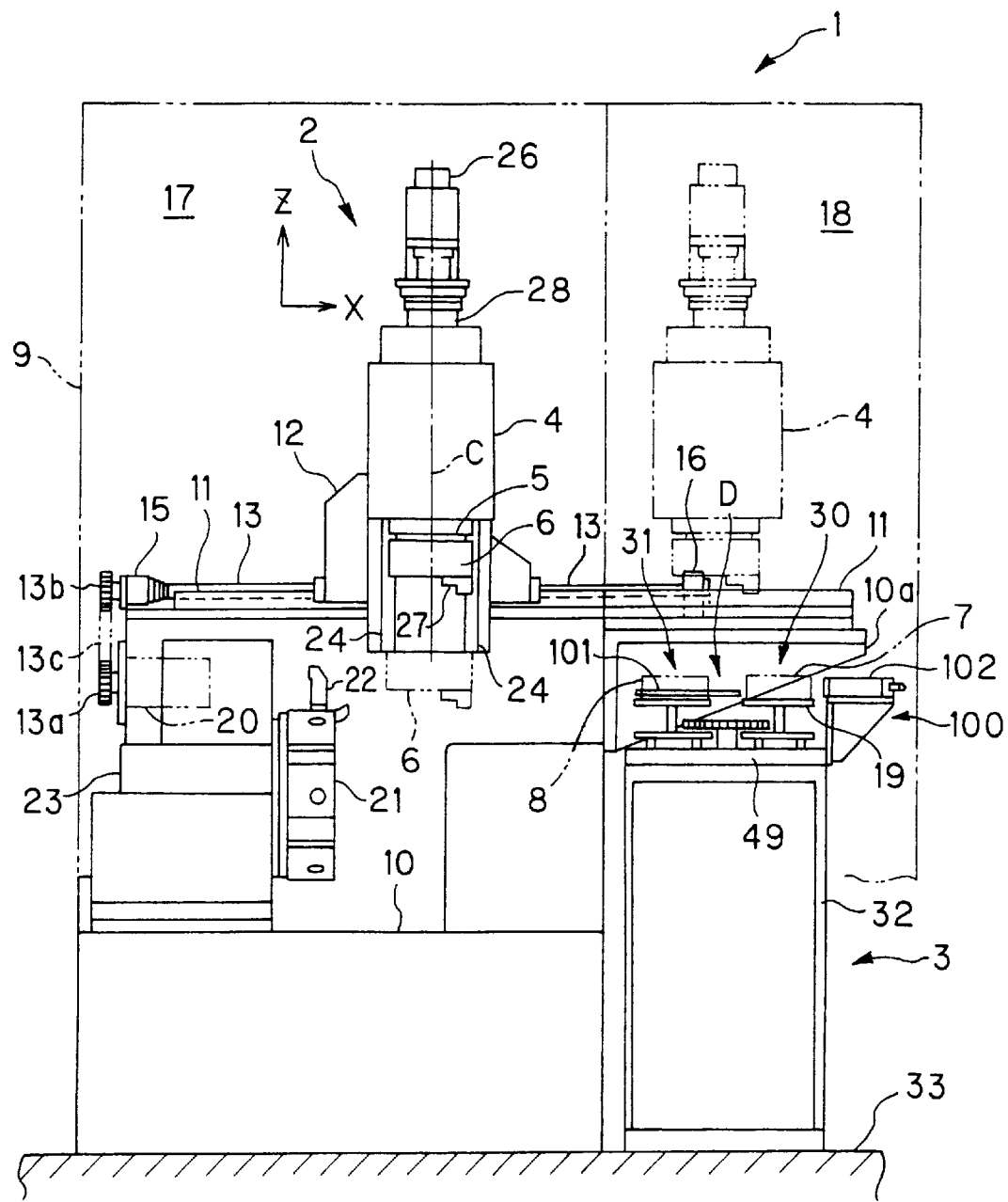
Figure 3:
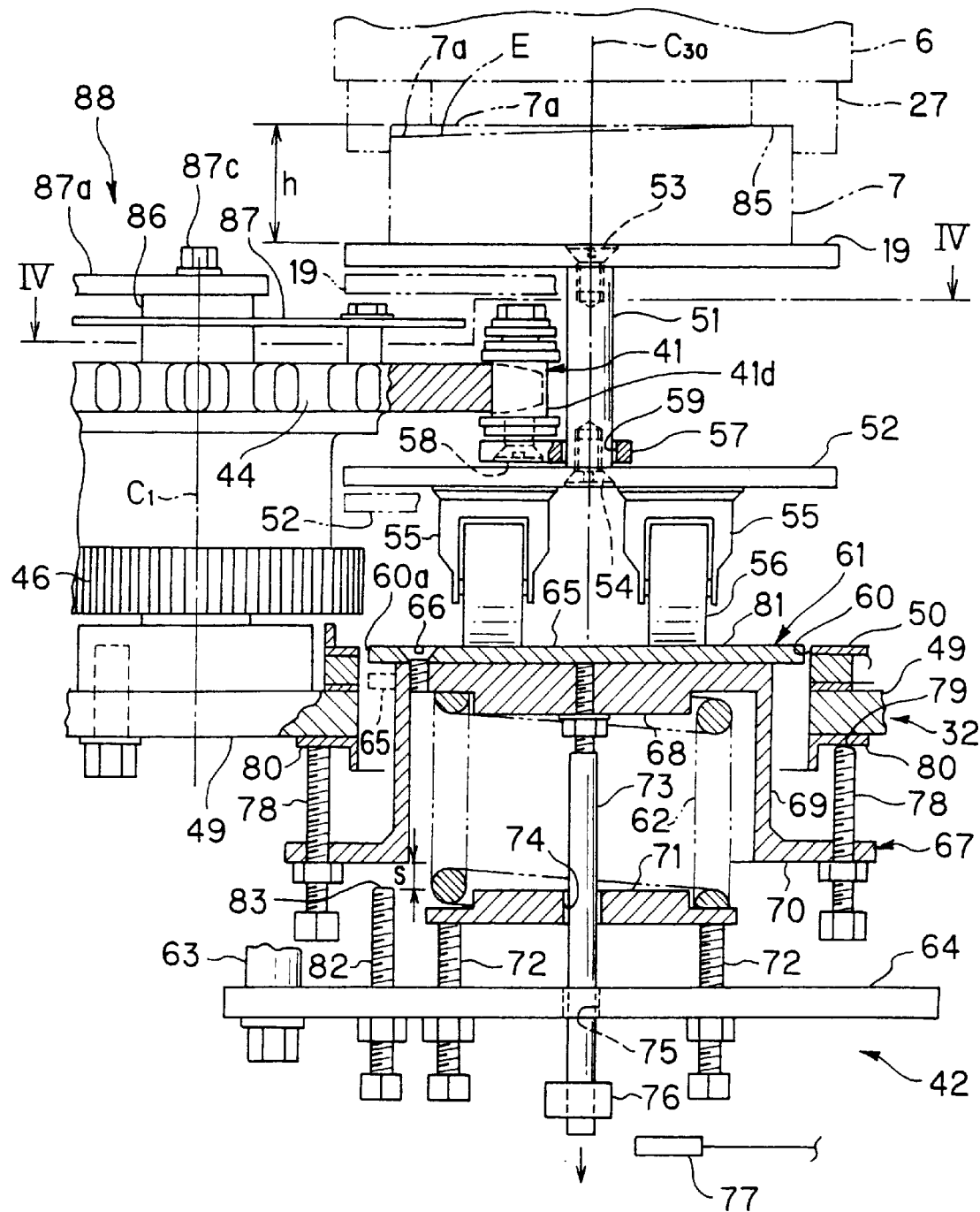
Figure 4:
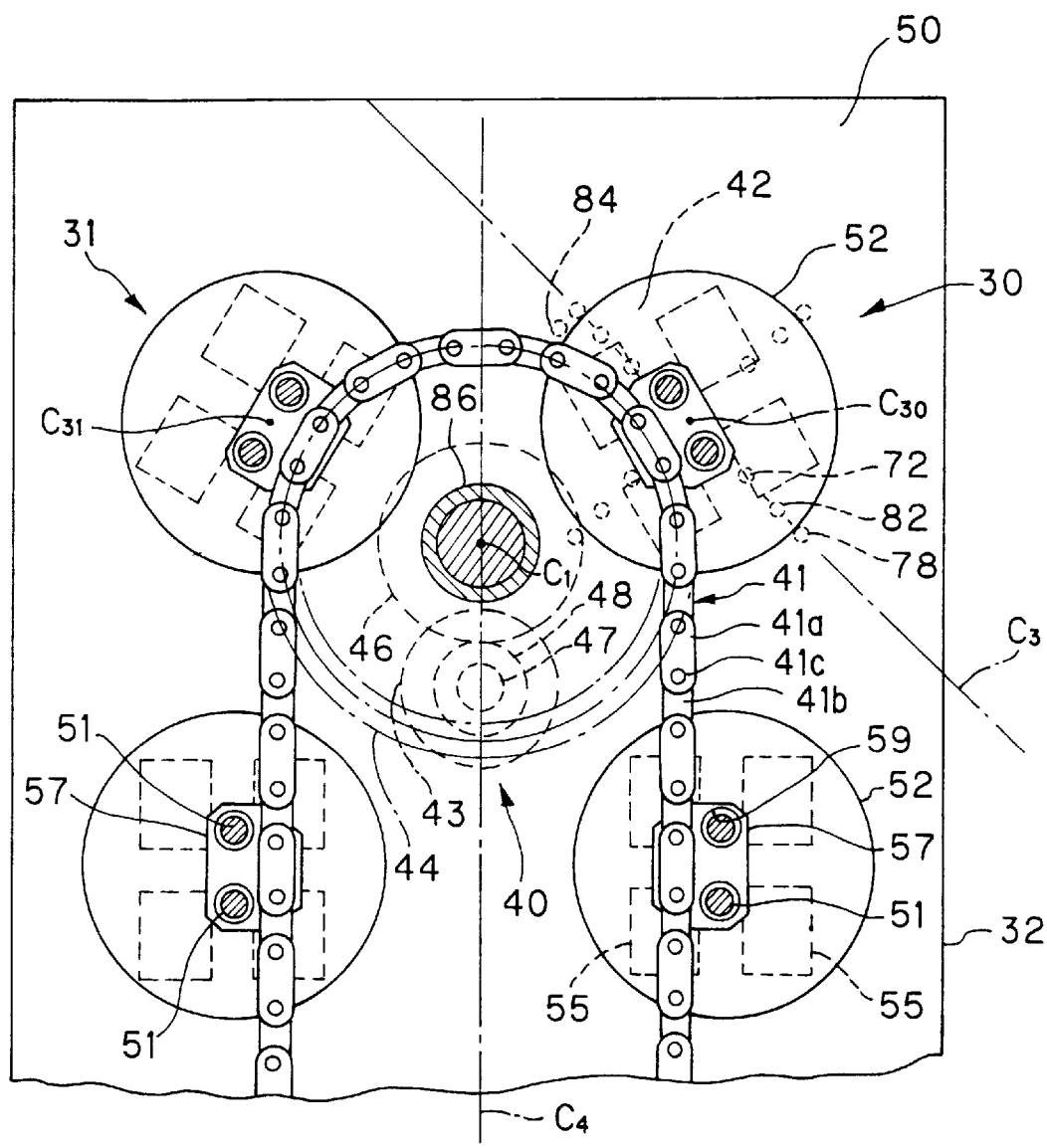
Figure 5:
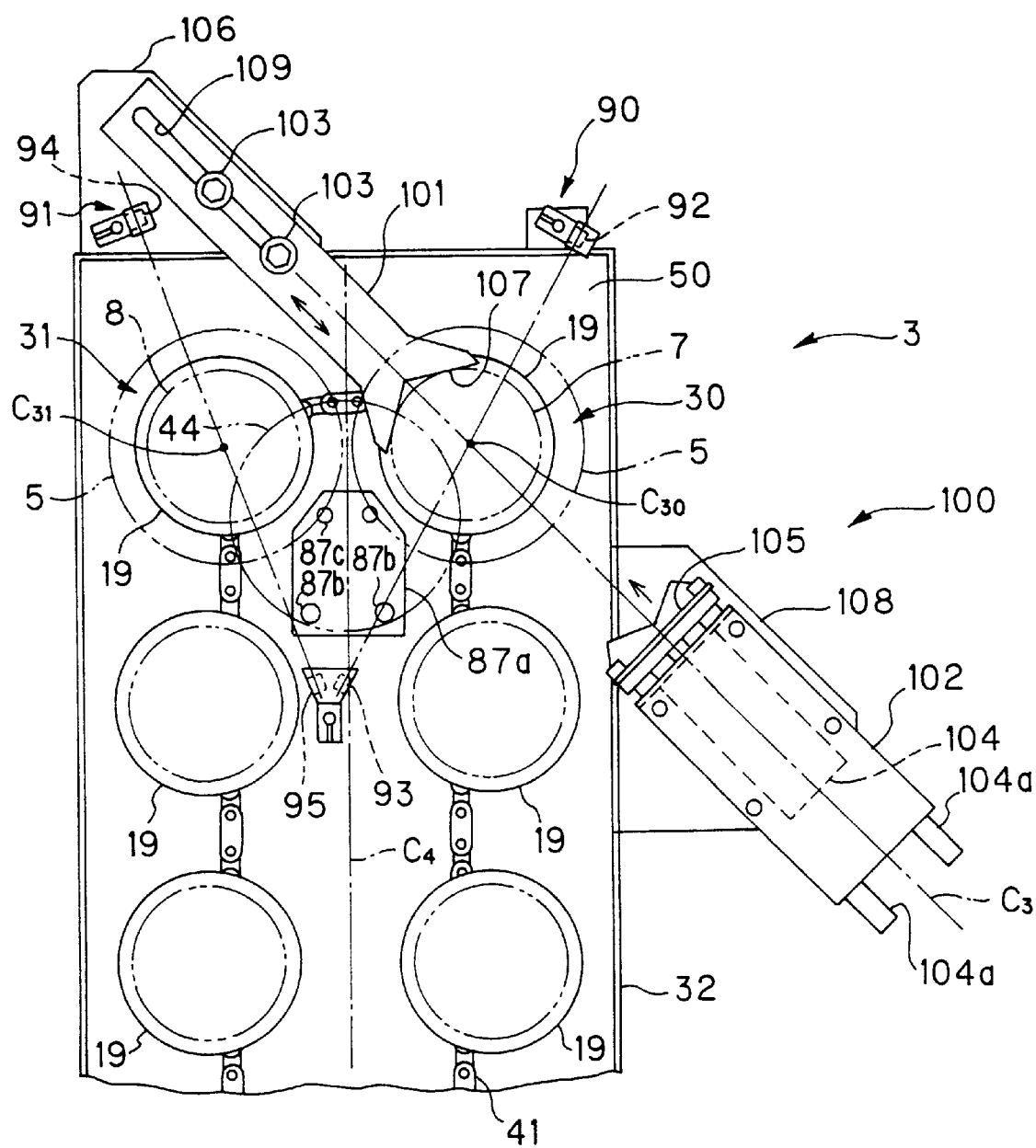

FIGS. 1 to 5 show a first embodiment of the present invention. FIGS. 1 and 2 are an overall plan view and an overall frontal view of a vertical lathe with a movable main spindle, respectively. FIG. 3 is an enlarged partial sectional view of a work feeder. FIG. 4 is a plan cross-sectional view taken along the line IV—IV of FIG. 3, from which a centering device is omitted. FIG. 5 is an enlarged partial plan view of the work feeder having the centering device.

As shown in FIGS. 1 and 2, the vertical lathe 1 with the movable main spindle (hereinafter simply referred to as "lathe") is provided with a machine body 2 and a work feeder 3 provided in the vicinity of the machine body 2 for performing an indexing operation of the work to a predetermined position, and is controlled by an NC (numerical control) system (not shown).

In the lathe 1, movable members, such as a headstock 4 and a main spindle 5, are moved in a Z-axis direction which is an axial direction C of the main spindle 5. The movable members are moved along a linear movement locus $C_0$ in a direction in parallel with an X-axis perpendicular to the Z-axis between a machining position and a work release/receipt location D of the work feeder 3.

A chuck 6 clamps and receives a non-machined work 7, such as a raw work directly from the work feeder 3. The chuck 6 releases a clamp of a machined work, 8 on the work feeder 3 after machining the work at the machining position, and gives the machined work 8 to the work feeder 3.

In this type lathe 1 in which the headstock 4 and the main spindle 5 are moved in the X-axis direction and the Z-axis direction, the main spindle 5 also serves to deliver the work.

In the lathe 1, a machining region 17 and a work release/receipt region 18 are provided. The working region where the machining work is performed at the machining position is shielded by a splash guard 9. The work release/receipt region 18 is adjacent to the machining region 17. In the region 18, a release/receipt of the work between the chuck 6 and the work feeder 3 is performed. The headstock 4 and the main spindle 5 are moved between both regions 17 and 18.

The work feeder 3 is disposed on the work release/receipt region 18. A part of the work feeder 3 (for example, at the work release/receipt location D) is located in the work release/receipt region 18, whereas the other part of the work feeder 3 is located in a region where the machined work 8 is removed and the non-machined work 7 is installed by the operator.

The work release/receipt location D is set in the work feeder 3. The location D includes a non-machined work receipt position 30 and a machined work receipt position 31.

In the non-machined work receipt position 30, in order to machine the work from now on the lathe 1, a pallet (work laying base) 19 is indexed so as to face the chuck 6 and positioned. Then, in the position 30, the non-machined work 7 laid on a top surface of the pallet 19 is clamped and received by a plurality of claws of the chuck 6.

The pallet 19 is indexed so as to face the chuck 6 also in the machined work release position 31 juxtaposed with the non-machined work receipt position 30. In the position 31, the machined work 8 which has been subjected to the machining work on the lathe 1 is laid on the top surface of the pallet 19 to be given by the chuck 6. Namely, the chuck 6 releases the clamp of the machined work 8 in the machined work release position 31 and lay the machined work 8 onto the pallet 19.

It is preferable that the non-machined work receipt position 30 and the machined work release position 31 are thus provided. However, it is possible to lay and give the machined work 8, after machining the work, onto the pallet 19 from which the non-machined work 7 has been received.

A pair of guide rails 11 are mounted in parallel in the X-axis direction on a top surface of a bed 10 of the lathe 1. A saddle 12 is movably disposed in the X-axis direction through a slide body (not shown) on the two guide rails 11. The guide rails 11 and the slide body constitute a linear rolling guide.

A bracket 10a is fixed by bolts (not shown) to an end face of the bed 10 on the side of the work feeder 3. The guide rails 11 are supported by the bed 10 and the bracket 10a.

Incidentally, it is possible to integrally form the bracket 10a and the bed 10 with each other. Also, it is possible to form a single guide rail in assembling adjustment by dividing each guide rail 11 on a portion on the bed 10 and the bracket 10a.

By thus dividing the guide rails 11 and separating the bracket 10a from the bed 10 so that these components are assembled later, it is possible to change a regular vertical lathe to the vertical lathe having a structure allowing the lathe to give and take the work between the work feeder 3 and the lathe.

A screw shaft 13 of a ball screw for the X-axis is disposed in parallel with the guide rails 11 in an intermediate position of the two guide rails 11. A nut 14 fixed to the saddle 12 is engaged with the screw shaft 13.

Both end portions of the screw shaft 13 are rotatably supported by bearing devices 15 and 16 incorporating bearings. The screw shaft 13 is drivingly rotated in a forward direction and a reverse direction by a servo motor 20 for the X-axis through toothed pulleys 13a and 13b and a toothed belt 13c. Incidentally, the servo motor 20 and the X-axis ball screw may be coupled with each other directly by a connecting member.

The screw shaft 13 is rotated by the drive of the servo motor 20. Then, the saddle 12 is guided by the guide rails 11 through the nut 14 and moves in a reciprocation in the X-axis direction. This moving operation of the saddle 12 leads in the X-axis direction relative to a tool 22 of a turret 21.

The X-axis guide rails 11 and the screw shaft 13 are provided to extend up to a position on the work feeder 3.

Accordingly, the movable distance of the saddle 12 in the X-axis direction is elongated toward the work feeder 3.

The main spindle 5 is movable along the moving locus $C_0$ between a working location within the machining region 17 and the work release/receipt position D of the work feeder 3 in the work release/receipt region 18.

The feed of the non-machined work 7 to the main spindle and the discharge of the machined work 8 are performed directly by the chuck 6 mounted at a lower end of the main spindle 5.

The moving locus $C_0$ is a straight line connecting the machining position, a center $C_{31}$ (FIG. 4) of the machined work release position 31 and a center $C_{30}$ (FIG. 4) of the non-machined work receipt position 30 and is directed in the X-axis direction.

A tool rest 23 is mounted on the bed 10. The turret 21 is provided to be able to be swivelled and indexed about an axis in parallel with the X-axis in the tool rest 23. A plurality of tools 22 are radially mounted on the turret 21.

A pair of guide rails 24 are provided in parallel in the Z-direction on a front face of the saddle 12. The headstock 4 is movably engaged in the Z-axis direction with the pair of guide rails 24 through the slide members 25. The Z-axis guide rails 24 and the slide members 25 constitute a linear rolling guide.

A servo motor 26 for the Z-axis is mounted on the top portion of the saddle 12. A screw shaft of a Z-axis ball screw (not shown) is connected directly to an output shaft of the servo motor 26 to be drivingly rotated. Incidentally, the transmission of the driving power may be performed through an assembly of a gear mechanism, a toothed pulley and belt mechanism and the like between the output shaft of the servo motor 26 and the Z-axis ball screw.

A nut (not shown) fixed to the headstock 4 is engaged with the screw shaft of the Z-axis ball screw. Accordingly, when the screw shaft of the Z-axis ball screw is rotated by the drive of the Z-axis servo motor 26, the headstock 4 is guided by the Z-axis guide rails 24 through the nut to be moved up and down in the Z-axis direction.

The main spindle 5 is rotatably supported to the headstock 4. The main spindle 5 is rotated under the condition that the work is clamped by the chuck 6 provided at the lower end of the main spindle 5. The main spindle 5 is drivingly rotated by a built-in motor (not shown) incorporated into the interior of the headstock 4.

The chuck 6 is provided with a plurality (for example, three) of claws 27 for clamping the work. A chuck cylinder 28 is provided at an upper portion of the main spindle 5. The chuck cylinder 28 is driven and the positions of the claws 27 are shifted radially so that the work may be clamped or released.

The operation of the lathe 1 will now be described.

When the non-machined work 7 is machined by a command from the NC system of the lathe 1, the X-axis servo motor 20 is driven and the saddle 12 is moved to the work feeder 3 in the X-axis direction. In accordance with the movement of the saddle 12, the main spindle 5 is moved along the moving locus $C_0$ to the non-machined work receipt position 30 of the work feeder 3.

Subsequently, the Z-axis servo motor 26 is driven so that the main spindle 5 is moved downwardly together with the headstock 4. The chuck cylinder 28 is driven and the claws 27 of the chuck 6 are moved to thereby directly clamp the non-machined work 7. The headstock 4 is moved upwardly to a predetermined position after the clamping operation of the chuck 6.

Subsequently, the X-axis servo motor 20 is drivingly rotated so that the saddle 12 is guided by the X-axis guide rails 11 and is moved on the machining position in the X-axis direction. The Z-axis servo motor 26 is driven so that the headstock 4 is guided by the Z-axis guide rails 24 and moved in the Z-axis direction.

Thus, the main spindle 5 is moved to the machining position along the moving locus $C_0$. Thereafter, the turret 21 is swivelled and indexed to thereby index a desired tool 22 mounted on the turret 21. Then, the X-axis servo motor 20 and the Z-axis servo motor 26 are controlled by the NC system, and at the same time, a revolving speed of the main spindle 5 is controlled to thereby perform the cut work with the tool 22.

After the machining operation of the work has been finished, the X-axis servo motor 20 and the Z-axis servo motor 26 are driven, and the headstock 4 and the main spindle 5 are moved from the machining position to the machined work release position 31. The machined work 8 is removed from the chuck 6 and is laid on the pallet 19 located in the machined work release position 31.

In the case where a next work is to be machined, the headstock 4 is moved from the machined work release position 31 to the non-machined work receipt position 30. In the same manner as described above, the above-described steps are repeated after the completion of the clamping operation of the non-machined work 7 by the headstock 4.

The work feeder 3 with a centering device will now be described.

The work feeder 3 takes an intermittent swivel motion for indexing the non-machined works 7, in order, to a predetermined position (namely, the non-machined work receipt position 30). The swivel surface of the work feeder 3 is substantially in the horizontal direction.

The work feeder 3 is provided with a work feeder frame (hereinafter referred to as a frame) 32 disposed at a predetermined position in the vicinity of the machine body 2 of the lathe 1. The frame 32 stands on the floor surface 33 independently of the machine body 2.

Since it is sufficient to position the work feeder 3 at a predetermined position relative to the machine body 2, the frame 32 may be provided integrally with, or separately from, the machine body 2. For instance, the frame 32 may be mounted integrally with, or separately from, the bed 10 or the bracket 10a.

As shown in FIGS. 1 to 5, the work feeder 3 is provided with the swivel member that is provided on the frame 32 and drivingly rotated by the driving means, and the plurality of pallets 19. The pallets 19 are mounted on the swivel member and movably mounted on a surface of the frame 32 so that the works 7 and 8 are detachably mounted on a top surface of each pallet 19.

In this embodiment, an endless chain (hereinafter referred to as a chain) 41 is used as the swivel member. The chain 41 is provided on the frame 32 and drivingly rotated by the chain driving means 40 as the driving means. The plurality of pallets 19 are engaged to the chain 41.

Also, the work feeder 3 is provided with a supporting device 42. The supporting device 42 is provided in the work release/receipt location D where the pallet 19 is positioned in place for release/receipt of the works with respect to the chuck 6 and is provided in the frame 32.

The supporting device 42 supports the pallet 19, positioned in the work release/receipt location D, movably up and down in the axial direction C of the main spindle. Thus, the work feeder 3 may give and take the work under the condition that the work is depressed against the chuck 6 with a predetermined load.

According to this embodiment, the supporting device 42 is arranged in the non-machined work receipt potion 30. The supporting device 42 has a structure to support the pallet 19, positioned in the non-machined work receipt position 30, movably up and down in the axial direction C of the main spindle and movably obliquely. At the same time, the supporting device 42 biases the pallet 19 on the chuck 6 in the axial direction C of the main spindle.

Incidentally, in the embodiment, there is shown a case where the supporting device 42 is provided only in the non-machined work receipt position 30 but it is possible to also provide the other supporting device 42 in the machined work release position 31.

If this is attained, when the machined work 8 is given by the chuck 6 to the pallet 19 at the machined work release position 31, it is possible to smoothly lay the machined work 8 without any collision or drop onto the pallet 19.

Accordingly, there is no fear that the machined work 8 would be damaged.

The chain driving means 40 has a driving motor 43 including a reduction gear (see FIG. 4), a sprocket 44 and the other sprocket 45 or a rotary ring. The sprocket 44 is rotatably supported to the frame 32 and is driven by the driving motor 43 so as to be rotatable in the forward and reverse directions about one rotational center $C_1$ on the driving side. The other sprocket 45 or the rotary ring is supported to the frame 32 and is rotated in the forward and reverse directions about the other rotary center $C_2$.

The sprocket 44 is rotatably supported in the forward and reverse directions through bearings (not shown) to a support shaft 86 fixed to an upper frame 49 which forms the frame 32.

The chain 41 is laid around the sprocket 45 and the other sprocket 44. A chain made of metal and formed by connecting a plurality of links is used as the chain 41 provided on the frame 32. The chain 41 is composed of plates 41a and 41b, pins 41c, roller portions 41d (FIGS. 3 and 4), and the like, and is well known.

A large diameter gear 46 is coaxially provided in parallel on the sprocket 44 so as to be rotated together with the sprocket 44. The gear 46 and a small diameter gear 48 mounted on an output shaft 47 of the driving motor 43 are engaged with each other to form a speed reduction mechanism.

The rotational torque of the driving motor 43 is transmitted to the chain 41 under the condition it is decelerated through the output shaft 47, the gears 48 and 46 and the sprocket 44. The chain 41 takes the swivel motion.

A guide plate 50 is mounted on a top surface of the upper frame 49. The guide plate 50 is formed into an elongated shape in conformity with the chain 41 and is arranged in the horizontal direction. The chain 41 is positioned above and in parallel with the guide plate 50.

The pallet 19 is supported to a pallet support member 52 through a plurality (for example, two) of connecting rods 51 which are vertically arranged. The planar and disc-like pallet 19 and the support member 52 are in parallel with each other and are disposed coaxially with each other in the horizonal direction. The connecting rods 51 are fixed to the pallet 19 and the support member 52 by a fastening means such as screws 53 and 54.

Incidentally, the pallet 19 may take any other shape, such as a square shape. Namely, if the pallet 19 may carry the work and may be moved by the swivel member, it takes any shape.

A rolling means that is able to roll in any desired direction on a top surface of the guide plate 50 is provided under the support member 52. In this embodiment, a plurality (for example, four) of casters 55 are used for each pallet 19 as the rolling means. Each caster 55 has a free wheel 56 which may take a straight motion and turning motion.

The connecting rods 51 are connected through connecting members 57 to the chain 41. The connecting members 57 are formed substantially into rectangular plate shapes and disposed in the horizontal direction. The connecting members 57 are fixed to lower portions of predetermined links of the chain 41 by a fastening means, such as screws 58. The plurality (for example, fourteen in total) of connecting members 57 are provided at the constant pitch P on the chain 41.

Fitting holes 59 with which the connecting rods 51 are fit are formed in the vertical direction in the connecting members 57. The connecting rods 51 are movable up and down as desired within the fitting holes 59.

Thus, the plurality of pallets 19 connected through the connecting rods 51 and the connecting members 57 to the chain 41 are disposed above the guide plate 50 at the constant pitch P to take the swivel motion.

Mounted on a support shaft 86 of the sprocket 44 are a disc 87 which is a detected member rotating together with the sprocket 44 for indexing and a sensor mounting plate member 87a for detecting an index with a bolt 87c.

A sensor mounted on the plate member 87a for detecting an index (hereinafter referred to as a sensor) detects a corrugation formed in the disc 87 and controls the rotation of the driving motor 43 in accordance with an output signal of the sensor 87b. An index position detecting means 88 is constituted by the disc 87, the sensor 87b, and the like. The index position detecting means 88 may be an encoder, or the like, which may detect the index position of the pallet 19.

Accordingly, the pallets 19 are swivelled counterclockwise, as indicated by arrow G, and at the same time are moved intermittently by one pitch P to be indexed at predetermined positions.

Incidentally, if the driving motor 43 is rotated in the reverse direction as desired, the pallets 19 may make a clockwise swivel motion.

The supporting device 42 disposed in the non-machined work-receipt position 30 will now be described.

In the non-machined work-receipt position 30, an opening portion 60 is formed in the guide plate 50 and the upper frame 49. An elevating member 61 is provided in the opening portion 60 to be moved up and down, and slanted, as desired.

In the embodiment, since the opening portion 60 is in a circular shape, the elevating member 61 is in the form of a circular planar shape and is disposed through a predetermined gap 60a in the opening portion 60. When the elevating member 61 is positioned at an upper position, its upper surface 81 and the top surface of the guide plate 50 are substantially flush with each other. Incidentally, the opening portion 60 formed in the frame 32 and the elevating member 61 may take any other shape, such as a rectangular shape. If the elevating member is disposed with a predetermined gap, it may suffice.

The supporting device 42 supports the elevating member 61 movably up and down in the axial direction C of the main spindle and obliquely movable relative to the frame 32 and the guide plate 50. The supporting device 42 biases the elevating member 61 upwardly (namely, in a direction toward the chuck 6) in the axial direction C of the main spindle by a compression spring 62 as a biasing member.

The frame 32 is provided with a disc-like base plate 64. The base plate 64 is fixed to the upper frame 49 by a plurality (for example, four) of connecting members 63 arranged equally in a circumferential direction. The base plate 64 is disposed substantially in parallel with the upper frame 49.

The elevating member 61 has a circular disc 65 disposed through the predetermined gap 60a within the opening portion 60 and a stop-mounting member 67 fixed to a lower surface of the disc 65 by a fastening means such as screws 66.

The stop-mounting member 67 has a circular plate portion 68 screwed and fixed in intimate contact with the lower surface of the disc 65 by the screws 66, a cylindrical portion 69 fixed to the plate portion 68 and extending downwardly, and a flange 70. The annular flange 70 is fixed to a lower end of the cylindrical portion 69 and extends radially outwardly.

The spring 62 is interposed between the upper circular plate portion 68 and a lower circular supporting plate 71 under the compressed condition for biasing the elevating member 61 and the like upwardly. The supporting plate 71, the base plate 64, the stop mounting member 67 and the disc 65 are arranged substantially in parallel with each other coaxially with a center $C_{30}$ of the non-machined work receipt position 30.

The lower surface of the supporting plate 71 is supported by a plurality (for example, four) of screw members 72 screwed in the base plate 64 and arranged equally in a circumferential direction. It is possible to adjust the spring force of the spring 62 by adjusting the screws 72 thereby moving the supporting plate 71 up and down.

A rod-like member 73 directed downwardly is screwed and fixed in a central portion of the disc plate portion 68. The rod-like member 73 is caused to pass through a through-hole 74 formed in the central portion of the supporting plate 71 and a through hole 75 formed in a central portion of the base plate 64. The rod-like member 73 is movable together with the elevating member 61.

Since the rod-like member 73 is fit with the through-hole 74 of the supporting plate 71, the supporting plate 71 is always engaged with the screw member 72 without any lateral displacement.

A detected portion 76 is adjustably mounted on a lower portion of the rod-like member 73. A lower limit detector 77 using a microswitch, a photoelectric sensor, and the like, is mounted through a mounting means (not shown) on the frame 32.

When the chuck 6 pushes the non-machined work 7 so as to grip the non-machined work 7, if the detected portion 76 is lowered exceeding the predetermined position, the detected portion 76 is detected by the lower limit detector 77 so that the generation of the abnormality may be detected.

Accordingly, a regular elevating motion position of the headstock 4 in the non-machined work receipt position 30 is programmed in advance. In the case where an axial dimension (thickness) h of the fed non-machined work 7 exceeds the regular dimension, when the claws 27 of the chuck 6 pushes the non-machined work 7 downwardly, the pallet 19, the elevating member 61, the rod-like member 73 and the like are lowered beyond the predetermined distance.

Then, since the lower limit detector 77 detects the lower operation position of the detected portion 76, the NC system is controlled on the basis of the detection signal to stop the lowering motion of the main spindle 5 and to display the alarm, or the like.

Thus, the fact that the non-machined work 7, which is out of the standards, has been fed is announced to the operator. Then, the machining error may be prevented in advance.

The upper surface 81 of the supporting device 42 for supporting the pallet 19 is substantially flush with the carrier surface (i.e., the top surface of the guide plate 50) of the frame 32 when the chuck 6 does not press the non-machined work 7 (or the machined work 8) in the axial direction C of the main spindle. Thus, the parallel 19 may be moved.

For this reason, a plurality (for example, four) of screw members 78 as first stops are screwed in the flange 70 and are arranged equally in the circumferential direction. The screw members 78 are provided for the purpose of limiting the upward movement of the elevating member 61. Upper end portions 79 of the screw members 78 are brought into contact with the lower surface 80 of the upper frame 49 by the spring force of the spring 62.

If the screw members 78 are adjusted, it is possible to move the elevating member 61 in the vertical direction.

Accordingly, it is possible to adjust the height position of the disc 65 so that the upper surface 81 of the disc 65 and the top surface of the guide plate 50 are substantially flush with each other. Thus, the casters 55 are smoothly rotated along the top surfaces of the guide plate 50 and the disc 65.

Under the condition the main spindle 5 is not moved to receive the non-machined work 7, the upper end portions 79 of the screw members 78 are brought into contact with the lower surface 80 of the upper frame 49 so that the disc 65 and the guide plate 50 are substantially flush with each other for waiting for the main spindle 5.

A plurality (for example, four) of screw members 82 as second stops are screwed and uniformly arranged in the circumferential direction in the base plate 64. The screw members 82 are provided for the purpose of limiting the downward movement of the elevating member 61. The upper end portions 83 of the screw members 82 are arranged to face the lower surface of the flange 70.

When the elevating member 61 is lowered against the spring force of the spring 62 and the flange 70 is brought into contact with the screw members 82, the elevating member 61 is no longer lowered beyond this position. By adjusting the screw members 82, it is possible to adjust a maximum stroke S (i.e., the lowering movement amount of the disc 65) of the elevating movement of the elevating member 61.

A limit member 84 (see FIG. 4) projecting upwardly for preventing the rotation is fixed to the flange 70. An upper portion of the limit member 84 is engaged with an engagement hole (not shown) formed in the upper frame 49, with a gap, movably in the axial direction, or the like, for limiting the elevating member 61 under the non-rotatable condition.

When the chuck 6 is to grip the non-machined work 7, the movement stroke of the headstock 4 in the Z-axis direction is programmed to be somewhat large, the chuck 6 somewhat depresses the non-machined work 7 downwardly so that the gripping operation may be performed under the condition that the spring 62 is compressed.

Accordingly, in the case where the chuck 6 receives the non-machined work 7, even after the claws 27 have been brought into contact with the non-machined work 7, the main spindle 5 is somewhat further moved downwardly in the axial direction C of the main spindle.

The pallet 19, the connecting rods 51, the support member 52, the casters 55 and the elevating member 61, together with the non-machined work 7 are lowered against the spring force of the spring 62 in accordance with the lowering movement of the main spindle 5. Under the lowered condition at the predetermined position, the claws 27 are closed to grip the non-machined work 7.

Thus, even if there is some non-uniformity in dimension h of the non-machined work 7 in the axial direction C of the main spindle, the non-uniformity is absorbed by the deformation of the spring 62 so that the non-machined work 7 may be brought into intimate contact with the end faces 85 of the claws 27 of the chuck 6 without fail.

Accordingly, it is possible to perform the positioning in the axial direction C of the main spindle and to perform the gripping operation of the non-machined work 7 by the chuck 6 without fail and with high precision, simultaneously with the centering operation by the gripping operation of the claws 27.

Also, the claws 27 and the non-machined work 7 are brought into contact with each other against the force of the spring 62. Accordingly, it is possible to grip the non-machined work 7 under the condition that the end faces 85 of the claws 27 and the non-machined work 7 are firmly brought into intimate contact with each other without imposing any excessive load on the main spindle 5.

A non-machined work presence/absence detecting means 90 and a machined work presence/absence detecting means 91 are provided in the work feeder 3 (see FIG. 5).

The non-machined work presence/absence detecting means 90 detects whether or not the non-machined work 7 is laid on the top surface of the pallet 19 positioned in the non-machined work receipt position 30 and may, for example, be a projection type photoelectric switch. The non-machined work photoelectric switch (non-machined work presence/absence detecting means) 90 is provided with a photo emitter 92 and a photo receiver 93 mounted on the frame 32 and/or the guide plate 50.

The machined work presence/absence detecting means 91 detects whether or not the machined work 8 is laid on the top surface of the pallet 19 positioned in the machined work release position 31 and may, for example, be a projection type photoelectric switch. The machined work photoelectric switch (machined work presence/absence detecting means) 91 is provided with a photo emitter 94 and a photo receiver 95 mounted on the frame 32 and/or the guide plate 50.

A ray of light is projected from the photo emitter 92 to the photo receiver 93 to detect the presence/absence of the non-machined work 7, and a ray of light is projected from the photo emitter 94 to the photo receiver 95 to detect the presence/absence of the machined work 8.

Incidentally, the photoelectric switches 90 and 91 may be of a feedback reflex type or a diffusion reflex type other than the projection type. Also, it is possible to take a reverse arrangement of the photo emitters and the photo receivers.

When the machined work photoelectric switch 91 produces a detecting signal representative of the presence of the machined work 8 on the pallet 19 in the machined work release position 31, if the main spindle 5 is moved to the machined work release position 31, there is a fear that the work gripped by the chuck 6 and the machined work 8 on the pallet 19 would collide with each other.

Accordingly, the fact that the machined work photoelectric switch 91 produces the detection signal representative of the absence of the machined work 8 is a condition that the main spindle 5 may move to the machined work release position 31. If this condition is met, the machined work 8 is sent and laid onto the pallet 19 in the machined work release position 31.

On the other hand, while the machined work photoelectric switch 91 is producing the detection signal representative of the presence of the machined work 8, an interlock such that the main spindle 5 is not moved to the machined work release position 31 to thereby prevent the collision.

A The non-machined work photoelectric switch 90 is provided for the purpose of preventing re-machining of the machined work 8 or idle machining.

Under the condition that a detection signal representative of the presence of the non-machined work 7 on the pallet 19 in the non-machined work receipt position 30 is produced by the non-machined work photoelectric switch 90, the main spindle 5 is moved to the non-machined work receipt position 30 to thereby grip the non-machined work 7.

Accordingly, there is no possibility that the gripping operation is performed in the non-machined work receipt position 30 by the chuck 6 under the condition of the absence of the non-machined work 7. It is possible to enhance the efficiency of the machining operation while preventing idle machining. Also, it is possible to prevent re-machining of the machined work.

The centering device 100 mounted on the frame 32 will now be described.

The centering device 100 has a function of positioning and centering the non-machined work 7 on the pallet 19 to a predetermined position where the non-machined work 7 may be received by the chuck 6 when the pallet 19 is indexed and positioned in the non-machined work receipt position 30. The centering device 100 is disposed in the non-machined work receipt position 30 and is provided in the frame 32.

A centerline $C_3$ of the centering device 100 is provided at a position at a slant angle relative to a longitudinal center axis $C_4$ of the work feeder 3. Thus, the centering device 100 no longer obstructs the swivel motion of the pallet 19 which carries the work, and no longer obstructs the operation of gripping or releasing the work by the main spindle 5 in the non-machined work receipt position 30 or the machined work release position 31.

The centering device 100 is provided with a stationary centering member 101 provided on the centerline $C_3$ and a movable centering member 102 to be automatically controlled by the machining program.

The stationary centering member 101 is provided on the frame 32 in a position adjustable manner in a radial direction of the non-machined work 7 laid on the top surface of the pallet 19 indexed and positioned in the non-machined work receipt position 30. The centering member 101 is fixedly positioned in a desired position in the direction of the centerline $C_3$ by a fastening member, such as bolts 103.

The centering member 101 may be brought into contact with one side of an outer circumferential surface of the non-machined work 7.

The bolts 103 are engaged adjustably in position with an elongated hole 109 formed longitudinally in the direction along the centerline $C_3$ in the stationary centering member 101 and are positioned and fixed to a desired position in accordance with the diameter of the non-machined work 7.

The movable centering member 102 is located along the centerline $C_3$ and is provided on the frame 32 to face the stationary centering member 101 and is driven by an advancement/retraction means, such as an air cylinder 104. Incidentally, reference characters 104a denote guide rods.

A pusher 105 mounted on a front face of the movable centering member 102 is moved back and forth in the direction (i.e., the radial direction of the non-machined work 7) along the centerline $C_3$ by the air cylinder 104. The pusher 105 pushes against the stationary centering member 101 from the other side of the outer circumferential surface of the non-machined work 7 for centering.

The stationary centering member 101 is supported by a bracket 106 fixed to the frame 32 and is arranged in the horizontal direction.

A tip end portion 107 of the stationary centering member 101 is formed into a V-shape so as to hold the side surface of the non-machined work 7. Accordingly, the center position of the non-machined work 7 may be identified with the center $C_{30}$ of the non-machined work receipt position 30 on the centerline $C_3$. The stationary centering member 101 is in the form of a plate and is disposed somewhat above the top surface of the pallet 19.

The non-machined work 7, which has been indexed to the non-machined work receipt position 30, is centered by the centering device 100 and is clamped by the chuck 6 of the main spindle 5. Thereafter, the pallet 19 at the non-machined work receipt position 30 becomes empty.

Accordingly, even if a preparatory changing operation for retracting the stationary centering member 101 is not effected, the pallet 19 is caused to pass below the stationary centering member 101 from the non-machined receipt position 30 without any obstruction by the stationary centering member 101 and is rotatively moved by one pitch P to the machined work release position 31.

As a result, during the machining operation of the works having the same diameter, it is unnecessary to effect the preparatory changing operations for the stationary centering member 101.

The movable centering member 102 is mounted on a bracket 108 fixed to the frame 32 and is arranged somewhat above the pallet 19.

A pusher 105 is formed into a planar shape perpendicular to the centerline $C_3$ or a V-shape. The pusher 105 is moved forwardly in the direction of the centerline $C_3$ and is brought into contact with a side surface of the non-machined work 7 to push the non-machined work 7 against the tip end portion 107 of the stationary centering member 101.

The pusher 105 identifies the center position of the non-machined work 7 with the center $C_{30}$ of the non-machined work receipt position 30.

After the completion of the centering operation, the pusher 105 is retracted to a retraction position and is ready for the next operation. At this time, it is possible for the pallet 19 to perform the swivel motion without any obstruction by the pusher 105.

The overall operation of the lathe 1 and the work feeder 3 will now be described.

During the start of the operation, in the work feeder 3, at least one pallet 19 is vacant and the non-machined works 7 are laid on all or part of the rest of the pallets 19. Then, the non-machined works 7 to be fed in order from the work feeder 3 are to be machined by the lathe 1 and the machined works 8 are to be returned back to the work feeder 3.

In the work feeder 3, which is kept in the waiting condition, the non-machined work 7 is laid on the pallet 19 in the non-machined work receipt position 30, and the pallet 19 in the machined work release position 31 is vacant.

On the other hand, in the machine body 2, the main spindle 5 gripping the work by the chuck 6 is drivingly rotated by the main spindle driving motor, the X-axis servo motor 20 and the Z-axis servo motor 26 are controlled, and at the same time, the revolving speed of the main spindle 5 is controlled to machine the work by the tool 22.

After the completion of the machining operation, when the work exchange command is presented for the next work, the X-axis servo motor 20 and the Z-axis servo motor 26 are driven so that the main spindle 5 is moved to the work receipt/release location D.

The lathe 1 is constructed so that the opening portion of the splash guard 9 is closed by the shield cover (not shown) mounted on the saddle 12 when the main spindle 5 has been moved to the machining region. However, a shutter may be provided between the machining region and the work receipt/release region.

Since the work feeder 3 is in a waiting condition, the non-machined work photoelectric switch 90 produces a detection signal representative of the presence of the non-machined work 7, and the machined work photoelectric switch 91 produces a detection signal representative of the absence of the machined work 8. Only when at least these two conditions are met, the headstock 4 is moved to the work receipt/release location D to perform the receipt/release of the works.

When the headstock 4 has reached the machined work release position 31, the main spindle 5 is lowered so that the machined work 8 is laid on the pallet 19. The claws 27 of the chuck 6 are opened to release the gripping operation of the machined work 8.

Subsequently, the main spindle 5 is moved from the machined work release position 31 to the non-machined work receipt potion 30. Then, the non-machined work 7 laid on the pallet 19 located in the non-machined work receipt position 30 is gripped by the claws 27.

Since the machined work release position 31 where the main spindle 5 has first reached from the machining position is located close to the machining position, there is no waste motion in the moving operation of the main spindle 5.

The non-machined work 7 is laid under the condition that it is centered on the pallet 19 in the non-machined work receipt position 30 and it is confirmed by the non-machined work photoelectric switch 90 that the non-machined work 7 is present. Thus, it is possible to perform the clamp of the non-machined work 7 by the chuck 6 without fail.

When the headstock 4 in which the claws 27 of the chuck 6 are opened has reached the non-machined work receipt position 30, the main spindle 5 is lowered. After the end faces 85 of the claws 27 have been pushed against the top surface 7a of the non-worked work 7, the non-machined work 7 is further pressed downwardly against the spring force of the spring 62 by a predetermined distance (for example several millimeters).

Then, the pallet 19, the connecting rods 51, the support member 52 and the casters 55 are moved downwardly together. The connecting rods 51 are movably fitted in the fitting holes 59 of the connecting members 57 mounted on the chain 41. Accordingly, even if the connecting rods 51 are lowered, the position of the heights of the connecting members 57, the chain 41, and the like, are kept unchanged.

Since the elevating member 61, such as the disc 65, depressed downwardly by the casters 55, and the like, is somewhat moved downwardly against the spring force of the 62 within the opening portion 60, the screw members 78 are separated away from the lower surface 80 of the upper frame 49.

In the case in which the thickness dimension h of the non-machined work 7 has the standard dimension, since the downward movement stroke of the elevating member 61 is also within the predetermined dimension range, the flange 70 is out of the contact with the screw members 82.

Thus, since the non-machined work 7 is pushed downwardly, the upper surface 7a of the non-machined work 7 is more firmly brought into the end faces 85 of the claws 27 by the force of the spring 62. Under this condition, the chuck 6 closes the claws 27 to firmly grip the non-machined work 7.

By the way, as described above, since the non-machined work 7 is not yet subjected to the machining operation, its shape and the axial dimension h are rough with non-uniformity. For example, in some cases, the upper surface 7a of the non-machined work 7 is slanted relative to the laying surface of the pallet 19, as shown by the two-dotted and dash line E (FIG. 3).

In such cases, if the claws 27 push the non-machined work 7 against the force of the spring 62, the pallet 19, the elevating member 61, and the like, are lowered under the slanted condition.

Since the gap 60a between the elevating member 61 and the opening portion 60 is relatively large, the elevating member 61 is smoothly lowered within the opening portion 60 under the slanted condition. As a result, under the condition that the upper surface 7a of the non-machined work 7 is firmly bought into intimate contact with the end faces 85 of the claws 27 by the spring force, the non-machined work 7 is firmly gripped.

Thus, according to the supporting device 42, it is possible to perform the gripping operation of the non-machined work 7 by the chuck 6 with high precision and without failure.

Thus, the main spindle 5 gripping the non-machined work 7 has moved to the machining region 17 and starts the cutting operation.

On the other hand, in the work feeder 3, a next non-machined work 7 is indexed to the non-machined work receipt position 30 in accordance with the pallet indexing command.

Namely, when the driving motor 43 is driven, the rotational torque thereof is transmitted through the output shaft 47, and the gears 48 and 46 to thereby rotate the sprocket 44.

In this case, by detecting the corrugation of the indexing disc 87 by the sensor 87b, the driving motor 43 is rotated and controlled so that the sprocket 44 is rotated counterclockwise through a predetermined angle.

The chain 41 is swivelled and moved by the rotation of the sprocket 44. Then, the connecting rods 51, the pallet 19, the support member 52 and the casters 55 are swivelled and moved together through the connecting members 57 mounted on the chain 41. The casters 55 are moved while rolling on the guide plate 50 and the disc 65.

When the pallet 19 is moved by one pitch P, the vacant pallet 19, which has been positioned in the non-machined work receipt position 30, is moved to the machined work release position 31. Since the pallet 19 which has been moved is vacant, there is no interference of the work with the stationary centering member 101.

Then, the next pallet 19 carrying the next non-machined work 7 thereon is moved to the non-machined work receipt position 30.

Thus, after the completion of the indexing operation, the pusher 105 is forwarded by driving the air cylinder 104 which is the hydraulic pressure cylinder. Thus, the non-machined work 7 is positioned under the condition that the next non-machined work 7 is inserted between the tip end portion 107 of the stationary centering member 101 and the pusher 105.

Thus, the centering operation is performed for the non-machined work 7. The center position of the non-machined work 7 is identified with the center $C_{30}$ of the non-machined work receipt position 30. Subsequently, the air cylinder 104 is driven in the reverse direction so that the pusher 105 is retracted to the retraction position.

As a result, in the non-machined work receipt position 30, the non-machined work 7 is positioned under the condition that the non-machined work 7 is centered. The machined work release position 31 is vacant. Thus, the execution of the pallet indexing command is completed.

This condition means the same condition as the original condition of the work exchanging steps. The next and subsequent steps are the same as those of the above-described operation.

(Embodiment 2)

Figure 6:
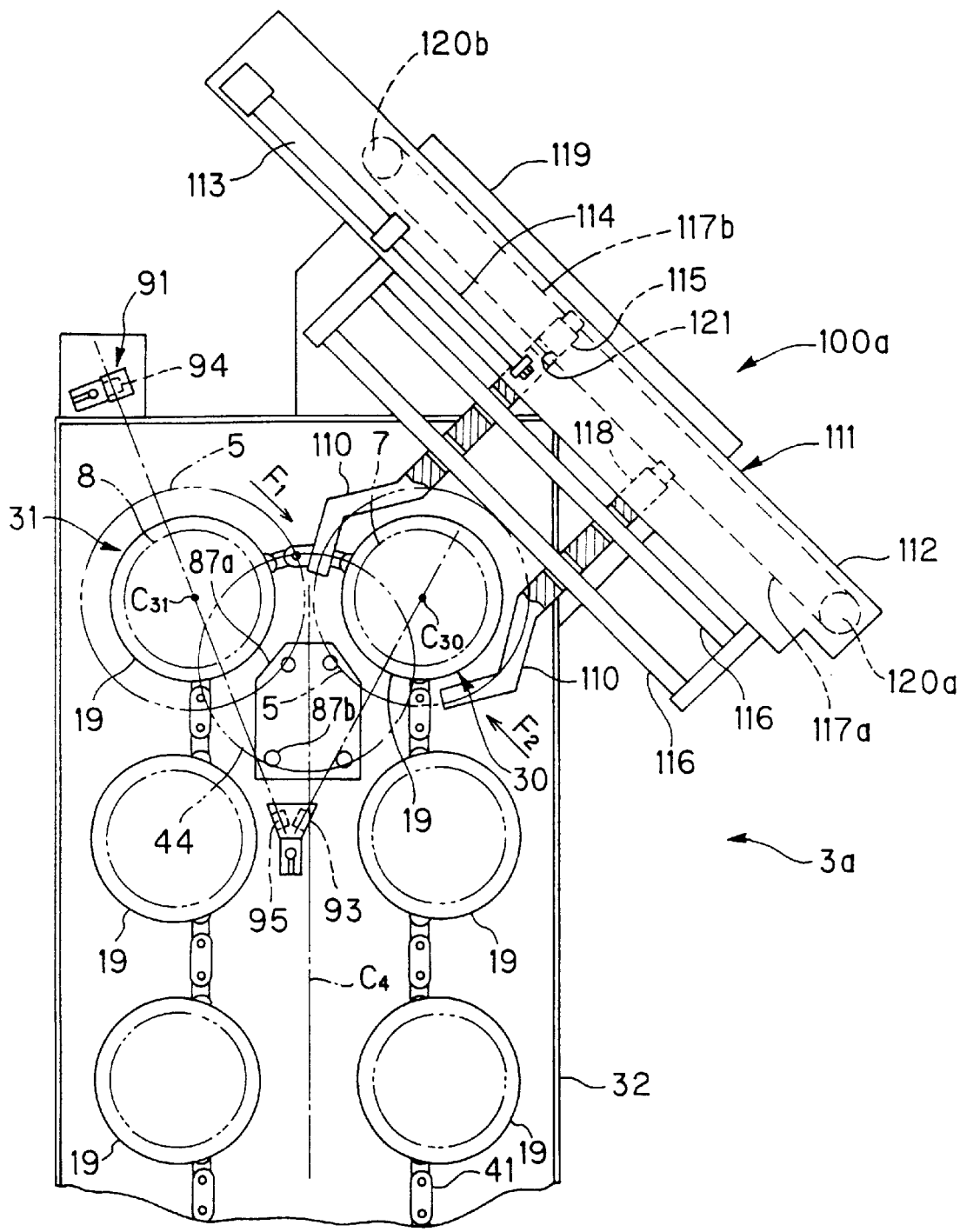
FIG. 6 is a view showing a second embodiment of the present invention and is an enlarged partial plan view of a work feeder having another centering device.

FIG. 6 is a view showing a second embodiment of the present invention and is an enlarged partial plan view of a work feeder 3a having another centering device 100a.

Incidentally, the same reference numerals are used to indicate the same or like portions or components as those of the work feeder 3 according to the first embodiment, and the explanation therefor will be omitted. The explanation will be made as to the different parts only.

As shown in FIG. 6, the centering device 100a is supported by a bracket 119 fixed to the frame 32 and is provided in the horizontal direction.

The centering device 100a is provided with a pair of arm members 110 and an arm opening/closing driving means 111. The pair of arm members 110 clamp the outer circumferential surface on both sides of the non-machined work 7 laid on the top surface of the pallet 19 indexed and positioned in the non-machined work receipt position 30 for centering. The driving means 111 opens and closes the pair of arm members 110 in synchronism with each other in the opposite directions to each other.

Tip end portions of the pair of arm members 110 are bent into L-shapes to face to each other. Inner surfaces of the tip end portions of the arm members 110 are brought into contact with the outer circumferential surface of the non-machined work 7. Therefore, a positional displacement between a central position between the pair of the arm members 110 and the center of the non-machined work 7 is corrected to thereby perform the centering operation of the non-machined work 7.

A hydraulic pressure cylinder 113 is mounted on one side of a body portion 112 for supporting the arm members 110. A cylinder rod 114 of the cylinder 113 is mounted on a proximal portion 115 of one of the arm members 110 through a mounting member.

A single or a plurality (for example, two) of guide rods 116 are provided to the body portion 112 in the moving direction of the arm members 110 for movably guiding and supporting both arm members 110.

One of the arm members 110 is driven by the cylinder 113 and is moved back and forth along the guide rods 116. Wires 117a and 117b are rotatably and movably wound in the forward and reverse directions around two rollers 120a and 120b within the body portion 112.

One wire 117a connected to the proximal portion 115 of one arm member 110 is connected to the proximal portion 118 of the other arm member 110 through the roller 120a.

Also, the other wire 117 connected to the proximal portion 115 of one arm member 110 is connected to the proximal portion 118 of the other arm member 110 through the roller 120b. The wire 117b penetrates to be movable within hole 121 formed in the proximal portion 115.

Accordingly, if the cylinder 113 is driven, the pair of arm members 110 are moved through the rod 114 and the wires 117a and 117b in the opposite direction in synchronism with each other to thereby perform the opening/closing operation.

In a waiting condition, the arm members 110 are kept under the maximum opened condition. When the non-machined work 7 is indexed to the non-machined work receipt position 30, the cylinder 113 is driven so that the arm members 110 are moved in closing directions (i.e., the arrows $F_1$ and $F_2$). Thus, the pair of arm members 110 push the non-machined work 7 from both sides to thereby perform the centering operation.

In the centering device 100a, since the pair of arm members 110 perform the opening/closing operation in synchronism with each other, it is possible to perform the high precision centering operation.

Also, the center position between the pair of arm members 110 is the center of the centering operation. Accordingly, if a preparatory step for identifying this center position with the center $C_{30}$ of the non-machined work receipt portion 30 is once carried out in advance, even if the outer diameter of the non-machined work 7 is changed, it is unnecessary to perform the preparatory step and it is possible to automatically perform the centering operation with high precision.

If an opening/closing position of the arm members 110 is detected, it is possible to automatically measure the outer diameter dimension of the non-machined work 7.

Incidentally, it is possible to perform the opening/closing operation in synchronizing the pair of arm members 110 by driving an arm opening/closing driving means provided with a rack and pinion mechanism, or a left and right screw mechanism by a rotary type fluid pressure cylinder, a driving motor, or the like.

(Embodiment 3)

FIGS. 7 to 9 are views showing a third embodiment of the present invention and are illustrations of the case in which a kind of the work is identified by a lathe 1a having the other supporting device 42a.

Incidentally, the same reference numerals are used to indicate the same or like portions or components as those of the first and second embodiments, and the explanation therefor will be omitted. The explanation will be made as to the different parts only.

As shown in FIGS. 7 to 9, in this lathe 1a, when the claws 27 of the chuck 6 somewhat push the work against the biasing force of the supporting device 42a under the condition that the claws are brought into intimate contact with the work (non-machined work 7 or machined work 8) and grip the work, a regular lowering movement position of the supporting device 42a is detected by the gripping position detecting means having a gripping position detecting sensor 77a. Then, when the detection signal is produced by the gripping position detecting means, the movement of the headstock 4 in the Z-axis direction is stopped, and at the same time the positional information of the headstock 4 in the Z-axis direction is read out by the NC system.

Then, the dimensions $h_1$, $h_2$ and $h_3$ in the axial direction of the work are calculated in accordance with the positional information that has been picked up so that the kind of the work is identified in accordance with the dimensions $h_1$, $h_2$ and $h_3$ in the axial direction.

The gripping position detecting means has the gripping position detecting sensor 77a, which is mounted on the frame 32 and uses a mircoswitch, a photoelectric sensor and the like, and a detected portion 76 to be detected by the sensor 77a.

The sensor 77a is disposed above the lower limit detector 77 and is disposed below a position of the detected portion 76 which is in the elevated position. The sensor 77a detects the operation of the detected portion 76 when the detected portion 76 mounted on the lower portion of the rod-like member 73 is lowered down to the predetermined position (predetermined position in the Z-axis direction).

Namely, in the non-machined work receipt position 30, the headstock 4 is moved at a predetermined velocity in the minus Z-axis direction (downwardly), and the claws 27 of the chuck 6 are normally brought into intimate contact with the non-machined work 7, and the non-machined work 7 is somewhat pushed against the spring force of the spring 62 until the sensor 77a detects the detected portion 76.

Thus, the pallet 19, the elevating member 61, the rod-like member 73, and the like, are lowered. Thus, if the detected portion 76 is lowered down to the predetermined position, the sensor 77a detects the detected portion 76 and sends the skip signal to the NC system.

At the same time, the moving of the headstock 4 in the Z-axis direction is stopped and, at the same time, the claws 27 are moved in the gripping direction to grip the non-machined work 7.

The positional information in the Z-axis direction, when the detected signal is produced, is read out by the NC system (not shown). The dimensions $h_1$, $h_2$ and $h_3$ in the axial direction of the non-machined work 7 are calculated in accordance with the positional information by a calculating section (not shown) through a custom program, or the like, installed in the NC system, thereby specify the kind of the non-machined work 7.

When the kind of work may be thus identified, even if a plurality of kinds of non-machined works 7 are laid on the pallets 19 at random, it is possible to perform the machining operation corresponding to the NC program specified for the kind of the work.

For example, in the third embodiment, the work axial direction dimension measuring means 130 is composed of the sensor 77*a*, the positional information readout section, the calculation section, and the like, in the NC system. The measuring means 130 measures the dimension in the axial direction of the non-machined work 7 when the non-machined work 7 on the pallet 19 is gripped by the chuck 6.

Incidentally, if the measuring means 130 may measure the dimension of the non-machined work 7 in the axial direction when the chuck 6 receives the non-machined work 7 on the pallet 19, and may identify the kind of the work to be machined in the lathe 1, 1*a* from the dimension of the non-machined work 7 in the axial direction, this may suffice. Also, in the measuring means, the position of the disc 65 of the elevating member 61, or the like, may be measured by a digital scale, or the like.

Also, an air cylinder which is a fluid cylinder is used instead of the biasing member 62, the movement stroke of the disc 65 in the axial direction of the work may be increased.

As described above, in the work feeder in accordance with the first to third embodiments, the machined work photo-electric switch 91 is provided, and an interlock such that the movable member, such as the main spindle 5 of the machine body 2, may be moved to the work feeder only under the safety condition is provided. Thus, it is possible to prevent interference of the movable member of the lathe with the work feeder to thereby enhance the safety aspect.

Also, even without a delivery device for delivering the works such as a robot, a loader, or the like, it is possible to directly exchange works between the work feeder and the spindle and to continuously perform the machining operation in the lathe. Even if the specialized pusher, or the like, is not provided, it is possible to bring the claws 27 of the chuck 6 into intimate contact with the non-machined work 7 and to grip the work. It is therefore possible to shorten the non-machined work receipt time.

Incidentally, in the foregoing description, the case where the main spindle 5 is drivingly rotated by the built-in motor has been described. However, it is possible to drivingly rotate the main spindle with a main spindle motor for driving through a gear mechanism or a belt/pulley mechanism.

The hydraulic pressure chuck for performing the gripping/grip releasing operation with the chuck cylinder is shown. However, the chuck may be another form of chuck such as an electric power chuck for driving scroll or the like, or by a driving motor for a gripping/grip releasing operation of the claws of the chuck.

Furthermore, the case is shown in which the pallets are swivelled by an endless chain as a swivel member. However, if the plurality of pallets may be swivelled on the work feeder frame, the swivel member may be a disc-shaped swivel member, or the like.

According to the present invention, since the single centering device 100 or 100*a* is provided in the non-machined work receipt position 30, it is unnecessary to mount a centering jig, or the like, for every pallet. The structure for the centering operation may be simplified.

In particular, in the vertical machine tool with the movable main spindle, since the stroke of the claws of the chuck is short, a high precision centering operation is required. According to the present invention, the centering device 100, 100*a* may perform the high precision centering operation.

Also, since the centering device 100, 100*a* is provided, even if the non-machined work 7 is laid on the pallet 19 at random without need for operator attention, the centering operation of the non-machined work 7 is carried out in the non-machined work receipt position 30 and the non-machined work 7 may be gripped by the chuck 6 without fail. Accordingly, it is possible to facilitate the operation when the non-machined work 7 is laid on the work feeder 3, 3*a* by the operator.

The same reference numerals throughout the drawings indicate the like or same components or members.

Various details of the invention may be changed without departing from its scope. Furthermore, the foregoing description of the embodiments according to the present invention is provided for the purpose of illustration only, and not for the purpose of limiting the invention as defined by the appended claims and their equivalents.

What is claimed is:

1. In a vertical machine tool, with a movable main spindle, in which a headstock for rotatably supporting the main spindle having an axis in a vertical direction or a direction slanted at a predetermined angle relative to the vertical direction is moved at least in a direction of the axis of said main spindle and in a direction perpendicular to the axis, a work feeder for giving and taking work to and from a chuck provided at a lower end of said main spindle, said work feeder comprising:

a work feeder frame provided at a predetermined position in the vicinity of a machine body of said machine tool;

a swivel member provided in said work feeder frame and driven by a driving means for swivelling;

a plurality of pallets mounted on said swivel member and provided movably on a delivery surface of said work feeder frame, each pallet having an upper surface on which the work is laid; and a supporting device provided on the work feeder frame and disposed in a work receipt and release location where the pallet is positioned for receiving and releasing the work between the pallet and the chuck, said supporting device supporting the pallet being positioned in the work receipt and release location and being movable up and down in the direction of the axis of said main spindle, and wherein the receipt and release of the work is performed under the condition that the work is kept depressed to said chuck by a predetermined load.

2. The work feeder according to claim 1, wherein the work receipt and release location includes:

a non-machined work receipt position where the chuck receives non-machined work laid on an upper surface of the pallet, from the pallet for machining the work in said machine tool; and a machined work release position, juxtaposed to said non-machined work receipt position, where the chuck releases machined work subjected to a machining operation by said machine tool onto an upper surface of the pallet, wherein said supporting device is provided at least in said non-machined work receipt position.

3. The work feeder according to claim 2, wherein said supporting devices are provided in said non-machined work receipt position and said machined work release position.

4. The work feeder according to claim 1, wherein an upper surface of said supporting device for supporting the pallet is substantially flush with the delivery surface of said work feeder frame when the chuck is not urged to depress non-machined work or machined work in the direction of the axis of said main spindle, whereby the pallet may be moved.

5. The work feeder according to claim 1, wherein said supporting device supports the pallet movably up and down in the direction of the axis of said main spindle and movably obliquely, so that non-machined work is gripped in intimate contact with the chuck.

6. The work feeder according to claim 1, wherein said supporting device includes:
   an elevating member provided movably up and down and movably obliquely within an opening portion formed in an upper frame, and a guide plate mounted on said upper frame for constituting said work feeder frame; and
   a biasing member for biasing said elevating member upwardly in the direction of the axis of said main spindle,
   wherein the upper surface of said elevating member and the upper surface of said guide plate are substantially flush with each other when said elevating member is located at an upper position.

7. The work feeder according to claim 6, wherein said elevating member has a rod-like member, directed downwardly, fixed downwardly from a central portion of the elevating member;
   a detected portion is mounted on a lower portion of said rod-like member, and a lower limit detector is mounted on said work feeder frame; and
   when the chuck depresses non-machined work for gripping the non-machined work, if said detected portion is operated in a lowering fashion exceeding a predetermined position, said lower limit detector detects the detected portion to detect generation of abnormality.

8. The work feeder according to claim 2, further comprising a non-machined work presence and absence detecting means for detecting whether or not non-machined work is laid on the upper surface of the pallet positioned in said non-machined work receipt position.

9. The work feeder according to claim 2, further comprising a machined work presence and absence detecting means for detecting whether or not machined work is laid on the upper surface of the pallet positioned in said machined work release position.

10. The work feeder according to claim 2, further comprising a centering device provided on the work feeder frame,
    wherein, when the pallet is indexed to said non-machined work receipt position, said centering device positions the non-machined work laid on the pallet to a predetermined position at which the chuck may receive the work.

11. The work feeder according to claim 2, further comprising a work axial direction dimension measuring means for measuring dimensions in the axial direction of the nonmachined work laid on the pallet when the chuck grips the non-machined work,
    wherein a kind of work to be machined in said machine tool is specified in accordance with the dimensions in the axial direction of the non-machined work.

12. The work feeder according to claim 1, wherein said driving means includes a chain driving means and said swivel member includes an endless chain driven by said chain driving means for swivelling.

13. The work feeder according to claim 12, wherein said chain driving means includes:
    a driving motor mounted on said work feeder frame;
    a sprocket supported rotatably by said work feeder frame, driven by said driving motor and rotated in forward and reverse direction about one rotational center on the driving side, as desired; and
    another sprocket supported on said work feeder frame and rotated in forward and reverse direction about another rotational center, as desired;
    wherein said sprocket is pivoted about a support shaft fixed to an upper frame constituting said work feeder frame, and said chain is wound around said sprocket and said other sprocket.

14. The work feeder according to claim 13, wherein a guide plate disposed in a horizontal direction and having an elongated rectangular shape corresponding to an overall shape of said chain is fixed to an upper surface of said upper frame, and said chain is positioned above and in parallel with said guide plate.

15. The work feeder according to claim 14, wherein the pallet is supported by a support member through connecting rods connected to said chain, and a plurality of the pallets are disposed above said guide plate at a constant pitch;
    a rolling means that rolls freely in any direction on the upper surface of said guide plate is mounted on a lower portion of said support member; and
    an index position of the pallet is detected by an index position detecting means to rotate and control said driving motor so that the pallet makes a swivel motion and is moved intermittently by one pitch to be indexed to a predetermined position.

16. In a vertical machine tool, with a movable main spindle, in which a headstock for rotatably supporting the main spindle having an axis in a vertical direction or a direction slanted at a predetermined angle relative to the vertical direction is moved at least in a direction of the axis of said main spindle and in a direction perpendicular to the axis,
    a work feeder for giving and taking work to and from a chuck provided at a lower end of said main spindle, said work feeder comprising:
    a work feeder frame provided at a predetermined position in the vicinity of a machine body of said machine tool;
    a swivel member provided in said work feeder frame and driven by a driving means for swivelling;
    a plurality of pallets mounted on said swivel member and provided movably on a delivery surface of said work feeder frame, each pallet having an upper surface on which the work is laid; and
    a centering device disposed in a non-machined work receipt position where the chuck receives non-machined work, laid on the upper surface of the pallet, from the pallet for machining the work in said machine tool, said centering device being provided on said work feeder frame for centering the non-machined work laid on the pallet positioned in said non-machined work receipt position, to a predetermined position where the chuck receives the work.

17. The work feeder according to claim 16, wherein said centering device is disposed at a position slanted at a predetermined angle relative to a longitudinal centerline of said work feeder, so as not to obstruct the swivel motion of the pallet on which the work is laid, and so as not to obstruct the work gripping operation of the main spindle.

18. The work feeder according to claim 16, wherein said centering device includes:
- a stationary centering member provided on said work feeder frame movably in a radial direction of the non-machined work laid on the upper surface of the pallet positioned in said non-machined work receipt position, said stationary centering member being fixedly positioned at a desired position by a fastening member and being brought into contact with an outer circumferential surface of the non-machined work; and
- a movable centering member provided on said work feeder frame to face said stationary centering member, said movable centering member being driven by an advancement and retraction moving means so that a pusher is moved back and forth in said radial direction for depressing an outer circumferential surface of the non-machined work toward said stationary centering member from the other side for centering.

19. The work feeder according to claim 16, wherein said centering device includes:
- a pair of arm members clamping, from both sides, an outer circumferential surface of the non-machined work laid on the upper surface of the pallet positioned in said non-machined work receipt position; and
- an arm opening and closing driving means for opening and closing said pair of arm members in synchronism.

* * * * *

UNITED STATES PATENT AND TRADEMARK OFFICE
CERTIFICATE OF CORRECTION

PATENT NO.: 6,055,892
DATED : May 2, 2000
INVENTOR(S): Kimitaka OTAKE

It is certified that an error appears in the above-identified patent and that said Letters Patent is hereby corrected as shown below:

On the title page of the patent in item [73], the assignment, change "Hitachi Seiko Co. Ltd. " to be --Hitachi Seiki Co. Ltd.--

Signed and Sealed this

First Day of May, 2001

Attest:

NICHOLAS P. GODICI

Attesting Officer          Acting Director of the United States Patent and Trademark Office